(12) United States Patent
Feng et al.

(10) Patent No.: US 11,575,237 B2
(45) Date of Patent: Feb. 7, 2023

(54) ADAPTER

(71) Applicant: LUXSHARE PRECISION INDUSTRY CO., LTD., Shenzhen (CN)

(72) Inventors: Yun Feng, Shenzhen (CN); Min Fan, Shenzhen (CN); Wenjun Tang, Shenzhen (CN)

(73) Assignee: LUXSHARE PRECISION INDUSTRY CO., LTD., Shenzhen (CN)

( * ) Notice: Subject to any disclaimer, the term of this patent is extended or adjusted under 35 U.S.C. 154(b) by 45 days.

(21) Appl. No.: 17/336,495

(22) Filed: Jun. 2, 2021

(65) Prior Publication Data

US 2022/0311196 A1 Sep. 29, 2022

(30) Foreign Application Priority Data

Mar. 23, 2021 (CN) .......................... 202110309030.0

(51) Int. Cl.
*H01R 31/06* (2006.01)
*H02G 11/02* (2006.01)

(52) U.S. Cl.
CPC ............. *H01R 31/06* (2013.01); *H02G 11/02* (2013.01)

(58) Field of Classification Search
CPC ............................... H02G 11/02; H02J 7/0042
See application file for complete search history.

(56) References Cited

U.S. PATENT DOCUMENTS 6,059,081 A 5/2000 Patterson et al.
6,806,682 B2 * 10/2004 Hsiao .................... H02J 7/0042
    320/111

(Continued)

FOREIGN PATENT DOCUMENTS

CN        203553997 U       4/2014
CN        209250295 U   *   8/2019
(Continued)

OTHER PUBLICATIONS

Chinese Office Action and Search Report for Chinese Application No. 202110309030.0, dated Aug. 1, 2022, with an English translation.

*Primary Examiner* — Briggitte R. Hammond
(74) *Attorney, Agent, or Firm* — Birch, Stewart, Kolasch & Birch, LLP

(57) ABSTRACT

Provided is an adapter. The adapter includes a housing component, an adapter assembly, a first connector, a second connector, and a charging cable assembly. The housing component is provided with an accommodation space. The adapter assembly is disposed in the accommodation space. The first connector is electrically connected to the adapter assembly and is able to be accommodated in the accommodation space. The charging cable assembly includes a charging cable body and an auto-retractable cable box disposed in the accommodation space. A first end of the charging cable body is secured to the auto-retractable cable box. A second end of the charging cable body is able to be accommodated in the auto-retractable cable box or is extendable out of the auto-retractable cable box. The auto-retractable cable box is electrically connected to the adapter assembly. The second connector is connected to the second end of the charging cable body.

11 Claims, 3 Drawing Sheets

(56) References Cited

U.S. PATENT DOCUMENTS

```
    8,167,633  B1      5/2012  Wu
2015/0349555  A1 *  12/2015  Ortiz Baeza ............. H02J 7/02
                                                         320/111
```

FOREIGN PATENT DOCUMENTS

| | | |
|---|---|---|
| CN | 210430984 U | 4/2020 |
| CN | 112134320 A | 12/2020 |
| CN | 212258449 U | 12/2020 |
| CN | 112421724 A | 2/2021 |
| CN | 212627646 U | 2/2021 |
| JP | 2018-61092 A | 4/2018 |
| TW | M461255 U1 | 9/2013 |
| TW | M466417 U | 11/2013 |
| TW | M506311 U | 8/2015 |
| TW | M508839 U | 9/2015 |

\* cited by examiner

ADAPTER

CROSS-REFERENCE TO RELATED APPLICATION(S)

This application claims priority to Chinese Patent Application No. 202110309030.0 filed Mar. 23, 2021, the disclosure of which is incorporated herein by reference in its entirety.

TECHNICAL FIELD

The present disclosure relates to the technical field of power adapters and, in particular, to an adapter.

BACKGROUND

Charging devices of various digital products like cellphones and computers include power adapters and charging cables. In the related art, one solution is that a power adapter and a charging cable are two independent structures that are used in combination. When going out, a consumer needs to carry both a power adapter and a charging cable and package the power adapter and the charging cable separately, the power adapter and the charging cable are inconvenient to be carried and easy to be lost. Another solution is that a power adapter and a charging cable form an integrated structure, and the charging cable is connected to the external end of the power adapter, resulting in a large size and a poor portability. Moreover, in the related art, a charging cable is mostly wound casually for storage, making the storage inconvenient and the structure messy. The long-time winding may further cause problems, such as breaking a charging cable or a poor contact, thus degrading the user experience.

SUMMARY

The present disclosure is to provide an adapter that reduces the size of the structure, improves portability, and facilitates use and storage.

The present disclosure adopts the technical solutions below.

An adapter is provided. The adapter includes a housing component, an adapter assembly, a first connector, a charging cable assembly, and a second connector.

The housing component is provided with an accommodation space.

The adapter assembly is disposed in the accommodation space.

The first connector is electrically connected to the adapter assembly and is able to be accommodated in the accommodation space.

The charging cable assembly includes a charging cable body and an auto-retractable cable box disposed in the accommodation space. A first end of the charging cable body is secured to the auto-retractable cable box. A second end of the charging cable body is able to be accommodated in the auto-retractable cable box or is extendable out of the auto-retractable cable box. The auto-retractable cable box is electrically connected to the adapter assembly.

The second connector is connected to the second end of the charging cable body.

Figure 1:
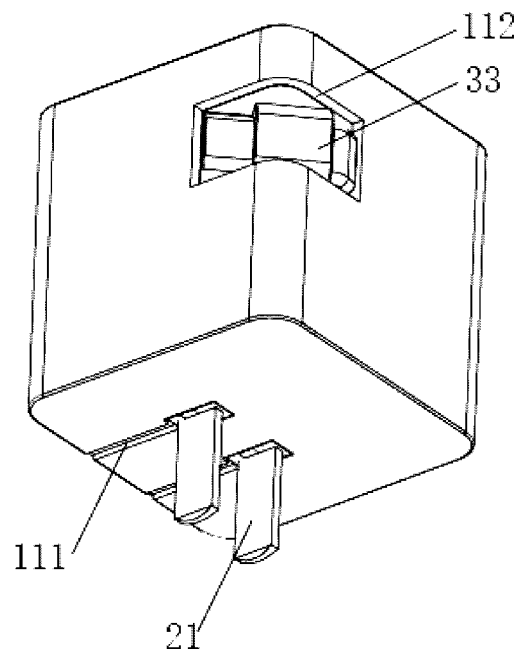
FIG. 1 is a schematic view illustrating a structure in which a first connector of an adapter extends out of an accommodation space according to an embodiment of the present disclosure.

REFERENCE LIST 1 housing component
11 plastic casing
111 first aperture
112 second aperture
12 plastic cover
2 adapter assembly
21 first connector
22 mounting bracket
221 accommodation recess
23 circuit board
24 metal bracket
3 charging cable assembly
31 charging cable body
32 auto-retractable cable box
321 conductive support
322 conductive connection plate
323 upper casing
3231 connection rod
324 lower casing
3241 cable outlet
3242 inner mounting recess
3243 outer mounting recess
325 conductive connection piece
33 second connector

DETAILED DESCRIPTION

The technical solutions of the present disclosure are further described hereinafter in conjunction with drawings and an embodiment. In the description of the present disclosure, terms "joined", "connected" and "fixed" are to be understood in a broad sense unless otherwise expressly specified and limited. For example, the term "connected" may refer to "securely connected", "detachably connected" or "integrated", may refer to "mechanically connected" or "electrically connected" or may refer to "connected directly", "connected indirectly through an intermediary", "connected inside two components" or "interactional between two components". For those of ordinary skill in the art, specific meanings of the preceding terms in the present disclosure may be understood based on specific situations.

In the present disclosure, unless otherwise expressly specified and limited, when a first feature is described as "above" or "below" a second feature, the first feature and the second feature may be in direct contact, or be in contact via another feature between the two features. Moreover, when the first feature is described as "on", "above" or "over" the second feature, the first feature is right on or obliquely on the second feature, or the first feature is simply at a horizontally higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

Figure 2:
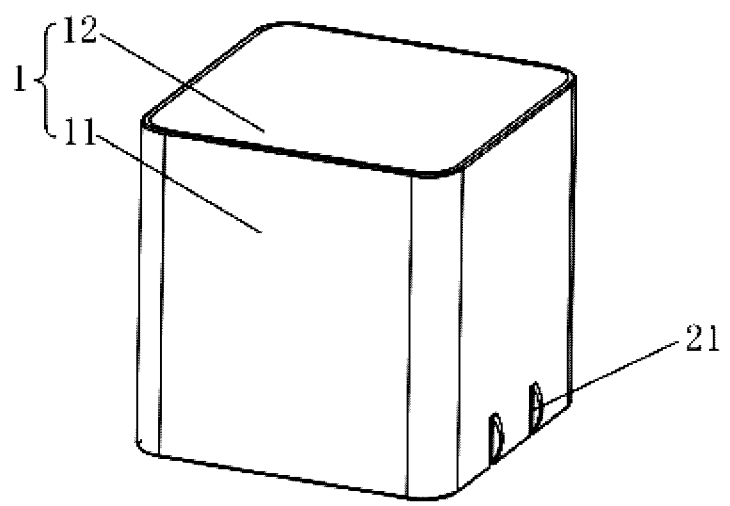
FIG. 2 is a schematic view illustrating a structure in which the first connector of the adapter is accommodated in the accommodation space according to an embodiment of the present disclosure.
Figure 3:
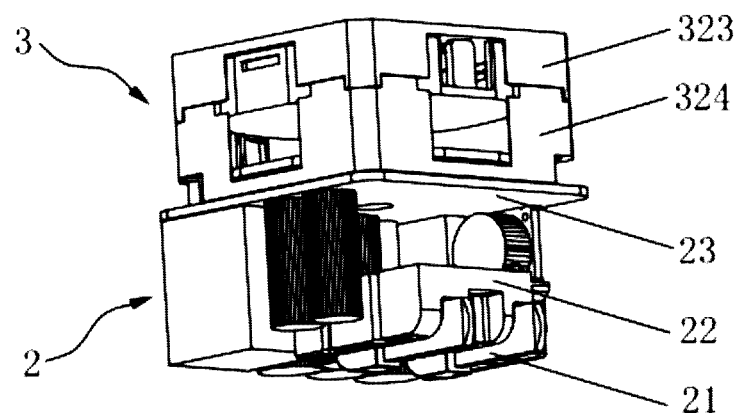
FIG. 3 is a schematic view illustrating the internal structure of the adapter according to an embodiment of the present disclosure.

This embodiment provides an adapter. As shown in FIGS. 1 to 3, the adapter includes a housing component 1, an adapter assembly 2, a first connector 21, a charging cable assembly 3, and a second connector 33. In an embodiment, the housing component 1 is provided with an accommodation space. The adapter assembly 2 is disposed in the accommodation space. The first connector 21 is electrically connected to the adapter assembly 2 and is able to be accommodated in the accommodation space. The charging cable assembly 3 includes a charging cable body 31 and an auto-retractable cable box 32 disposed in the accommodation space. A first end of the charging cable body 31 is secured to the auto-retractable cable box 32. The second end of the charging cable body 31 is able to be accommodated in the auto-retractable cable box 32 or is extendable out of the auto-retractable cable box 32. The auto-retractable cable box 32 is electrically connected to the adapter assembly 2. The second connector 33 is connected to the second end of the charging cable body.

The adapter assembly 2 and the charging cable assembly 3 are integrated into one structure. A consumer needs to buy only one product and does not need to match this product with other products. Moreover, the arrangement in which the adapter assembly 2 and the charging cable assembly 3 are both disposed in the housing component 1 facilitates sorting and carrying. The charging cable body 31 is retractable on the housing component 1. When the adapter is used, the consumer can stretch out and freely adjust the charging cable body 31 according to the length actually required so that the application range of the use distance is expanded. After the adapter is used, the charging cable body 31 is retractable into the housing component 1. The automatic retraction of the charging cable body 31 relative to the auto-retractable cable box 32 facilitates use and storage, simplifies the structure, avoids problems like a messy structure, a broken charging cable body, or a poor contact, and thus improves the user experience. Moreover, when the adapter is not used, the first connector 21 and the charging cable body 31 are both disposed in the accommodation space, reducing the size of the structure and enhancing portability.

In an embodiment, the housing component 1 includes a plastic casing 11 and a plastic cover 12. The plastic casing 11 is provided with an opening. The plastic cover 12 closes the opening. The plastic cover 12 and the plastic casing 11 enclose the accommodation space. The adapter assembly 2 and the charging cable assembly 3 are both disposed in the plastic casing 11. The plastic cover 12 closes the opening structure. During assembly, the adapter assembly 2 and the charging cable assembly 3 are mounted in the plastic casing 11 first. Then the plastic cover 12 is closed. In this case, the structure is simple and reliable, and the assembly is convenient. In an embodiment, the plastic casing 11 is provided with a first aperture 111 and a second aperture 112 communicating with the accommodation space separately. The first connector 21 is extendable out of the first aperture 111. The second connector 33 is extendable out of the second aperture 112. The separate arrangement of the first aperture 111 and the second aperture 112 avoids the structural interference and guarantees a simple structure.

Figure 4:
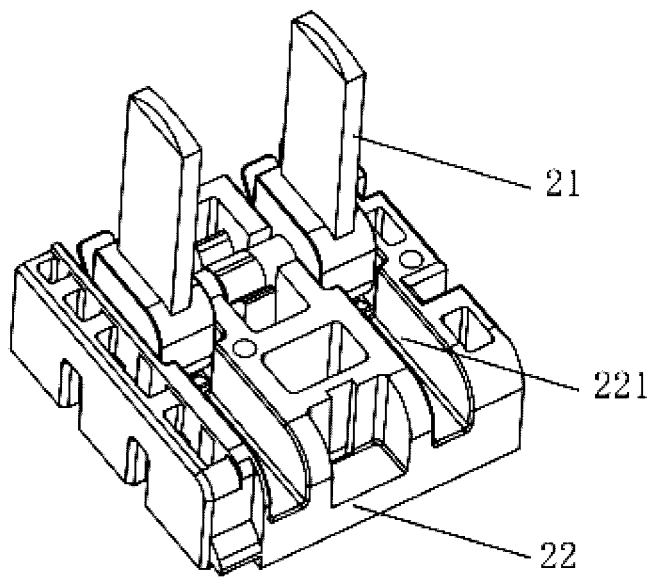
FIG. 4 is a schematic view illustrating a structure in which the first connector is disposed outside an accommodation recess according to an embodiment of the present disclosure.
Figure 5:
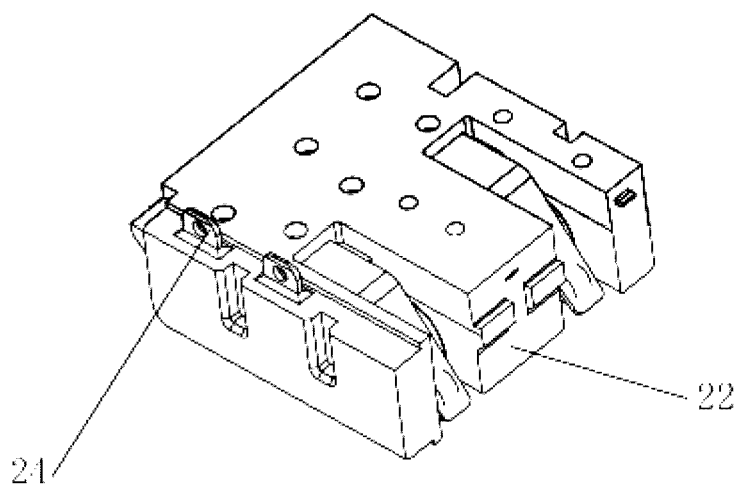
FIG. 5 is a schematic view illustrating a structure in which the first connector is disposed inside the accommodation recess according to an embodiment of the present disclosure.

Optionally, as shown in FIGS. 3 to 5, the adapter assembly 2 further includes a mounting bracket 22 secured in the accommodation space. The first connector 21 is rotatably connected to the mounting bracket 22. The mounting bracket 22 is provided with an accommodation recess 221. The first connector 21 is rotatable relative to the mounting bracket 22 to be accommodated in the accommodation recess 221 or extend out of the accommodation recess 221. When the adapter is used, the first connector 21 is rotated out of the accommodation recess 221 and extends out of the accommodation space. When the adapter is not used, the first connector 21 is rotated into the accommodation recess 221 to be accommodated in the accommodation space. The arrangement in which the accommodation recess 221 is configured to accommodate the first connector 21 guarantees a simple and reliable structure.

In an embodiment, as shown in FIG. 4, the first connector 21 is a metal pin. The metal pin includes two pin portions. The two pin portions are connected through a rotatable shaft. The rotatable shaft is rotatably connected to the mounting bracket 22. The two pin portions are rotatably disposed inside or outside the accommodation recess 221 through the rotatable shaft. In an embodiment, as shown in FIG. 2, when the metal pin is disposed inside the accommodation recess 221, a part of the metal pin protrudes from the housing component 1. When the adapter is used, the part of the metal pin protruding outside the housing component 1 is unplugged such that the metal pin is unplugged out of the accommodation space. In an embodiment, the mounting bracket 22 is detachably connected to the housing component 1 through a fastener, thus facilitating disassembly and assembly.

Optionally, as shown in FIG. 3, the adapter assembly 2 includes a circuit board 23 for dividing the accommodation space into a first accommodation space and a second accommodation space. The mounting bracket 22 is disposed in the first accommodation space. The first connector 21 is extendable out of the first accommodation space. The charging cable assembly 3 is disposed in the second accommodation space. The charging cable body 31 is extendable out of the second accommodation space. The arrangement in which the circuit board 23 separates the adapter assembly 2 from the charging cable assembly 3 guarantees a simple and convenient layout. In this embodiment, the second accommodation space is disposed on an opposite side where the first connector 21 extends out of the accommodation space, enabling the structure to be arranged in a vertical direction and thus guaranteeing a compact structure and a small size. In an embodiment, the circuit board 23 may be adhered to or buckled into the housing component 1.

In an embodiment, as shown in FIG. 5, the adapter assembly 2 further includes a metal bracket 24 disposed on the mounting bracket 22. The metal bracket 24 electrically connects the first connector 21 and the circuit board 23 so that the electric connection between the first connector 21 and the circuit board 23 is implemented. In an embodiment, the metal bracket 24 and the mounting bracket 22 are integrally injection molded. A first end of the metal bracket 24 is always in contact with the first connector 21. A second end of the metal bracket 24 is welded to the circuit board 23 through the charging cable body 31.

Figure 6:
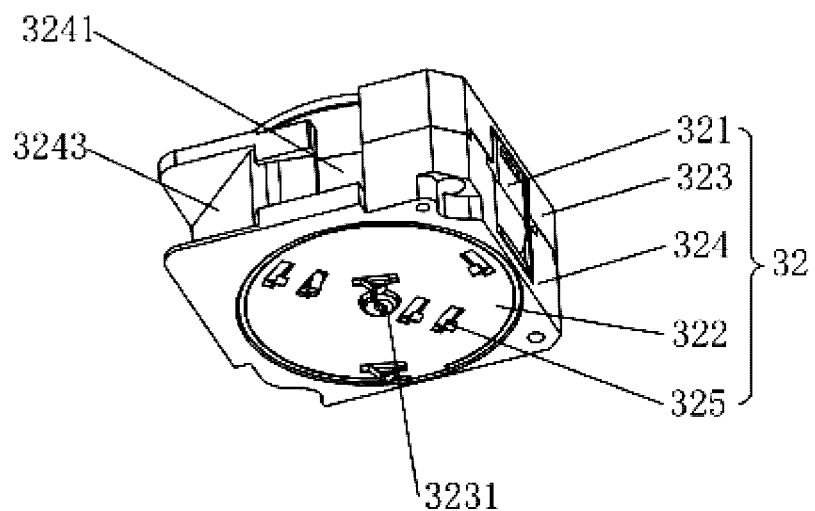
FIG. 6 is a schematic view illustrating the structure of an auto-retractable cable box according to an embodiment of the present disclosure.
Figure 7:
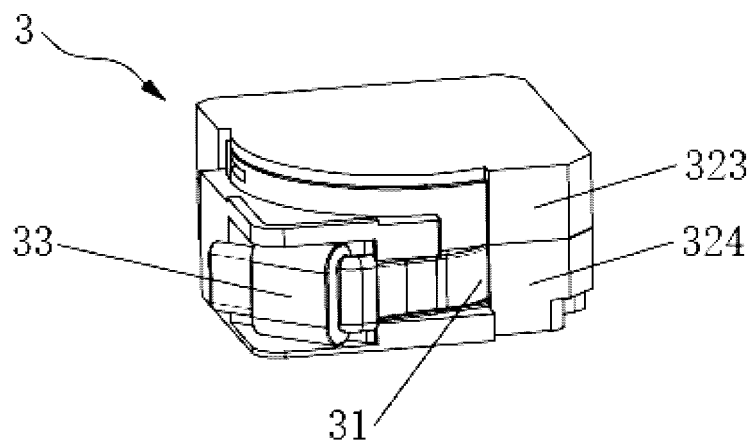
FIG. 7 is a schematic view illustrating the structure of a charging cable assembly according to an embodiment of the present disclosure.

Optionally, as shown in FIGS. 6 and 7, the auto-retractable cable box 32 includes a conductive support 321 and a conductive connection plate 322. The conductive support 321 includes a fixed shaft, a coil spring, and a reel sleeved on the fixed shaft. A first end of the coil spring is secured to the fixed shaft. A second end of the coil spring is connected to the reel. A first end of the charging cable body 31 is secured to the fixed shaft. In this case, the charging cable body 31 is retractable on the auto-retractable cable box 32. In an embodiment, the auto-retractable cable box 32 is a related art and not repeated herein. Optionally, the conductive connection plate 322 is electrically connected to the conductive support 321 and the adapter assembly 2 separately so that the electric connection between the charging cable body 31 and the adapter assembly 2 is implemented. In this case, a digital product is connected to an external power supply for charging through the charging cable body 31 and the adapter assembly 2. In an embodiment, the conductive support 321 is securely connected to the conductive connection plate 322, enhancing the reliability of the electric connection between the conductive support 321 and the conductive connection plate 322. In an embodiment, the conductive connection plate 322 is connected to the circuit board 23 through a conductive connection piece 325. A first end of the conductive connection piece 325 may be connected to the conductive connection plate 322 through a fastener. A second end of the conductive connection piece 325 may be welded to the circuit board 23.

Optionally, as shown in FIGS. 6 and 7, the auto-retractable cable box 32 further includes a mounting casing. The mounting casing is provided with an accommodation cavity. The conductive support 321 and the conductive connection plate 322 are both disposed in the accommodation cavity. The mounting casing is configured to protect the structures of the conductive support 321 and the conductive connection plate 322. The mounting case is fixed connected to the adapter assembly 2, enhancing the stability of the structure installation and thus enhancing the use reliability of the adapter. In an embodiment, the mounting casing is provided with a cable outlet 3241 communicating with the accommodation cavity. The charging cable body 31 passes through the cable outlet 3241 and is connected to the second connector 33. In an embodiment, optionally, the outside dimension of the second connector 33 is larger than the diameter of the cable outlet 3241 to prevent the second connector 33 from retracting back to the accommodation space. The arrangement in which the second connector 33 is always disposed outside the cable outlet 3241 enables the second connector 33 to be stretched directly for length adjustment in the next use, which is convenient to use.

Optionally, as shown in FIGS. 6 and 7, the mounting casing includes an upper casing 323 and a lower casing 324 that enclose the accommodation cavity. The cable outlet 3241 is disposed on the lower casing 324. In an embodiment, the conductive support 321 and the conductive connection plate 322 may be mounted sequentially on the upper casing 323 first, and then the lower casing 324 is mounted on the upper casing 323. Alternatively, the conductive connection plate 322 and the conductive support 321 may be mounted sequentially on the lower casing 324 first, and then the upper casing 323 is mounted on the lower casing 324. In this case, the assembly is facilitated. Optionally, the upper casing 323 is detachably connected to the lower casing 324, thus facilitating disassembly. In an embodiment, the upper casing 323 is detachably connected to the lower casing 324 through a fastener.

Figure 8:
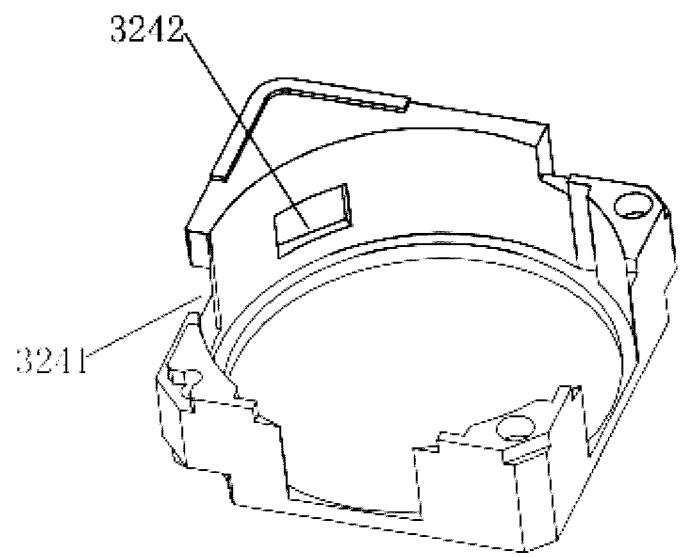
FIG. 8 is a schematic view illustrating the structure of a lower casing according to an embodiment of the present disclosure.

Optionally, as shown in FIGS. 6 to 8, each of the conductive support 321 and the conductive connection plate 322 is provided with a through hole. The mounting casing includes the upper casing 323 and the lower casing 324. The upper casing 323 includes a connection rod 3231. The connection rod 3231 passes through the through hole of the conductive support 321, the through hole of the conductive connection plate 322, and the lower casing 324. The upper casing 324 is supported on the lower casing 324. The connection rod 3231 is detachably connected to the adapter assembly 2 through a fastener. In this case, the lower casing 324 is interposed between the upper casing 323 and the circuit board 23. Thus the upper casing 323 and the lower casing 324 are fixed onto the adapter assembly 2, guaranteeing a stable structure installation and a compact structure. Optionally, the mounting casing is detachably connected to the adapter assembly 2, facilitating disassembly and assembly of the mounting casing and the adapter assembly 2. In an embodiment, the lowering case 324 is provided with a mounting aperture. The lower casing 324 and the adapter assembly 2 are detachably connected through fasteners and the mounting aperture, enhancing the mounting reliability.

Optionally, the auto-retractable cable box 32 is provided with a magnet structure. The second connector 33 is able to be attracted by the magnet structure to prevent the second connector 33 from falling off the auto-retractable cable box 32, guaranteeing a simple structure and an aesthetic appearance. Optionally, an inner mounting recess 3242 and an outer mounting recess 3243 are both disposed on the mounting case. In this embodiment, as shown in FIGS. 7 and 8, the inner mounting recess 3242 for mounting the magnet structure is disposed in the inner wall of the lower casing 324. The outer mounting recess 3243 for accommodating the second connector 33 is disposed in the outer wall of the lower casing 324. The inner mounting recess 3242 is disposed opposite to the outer mounting recess 3243, shortening the distance between the magnet structure and the second connector 33, thus strengthening the attractive force between the magnet structure and the charging cable body 31, and enhancing the effect of attraction.

Optionally, the housing component 1 is cuboid. The outer mounting recess 3242 is disposed at a corner of the housing component 1, increasing the utilization of the confined space of the adapter, reducing the outside dimension of the adapter, and offering a consumer a small and portable adapter.

In the adapter of the present disclosure, the adapter assembly and the charging cable assembly are integrated into one structure. A consumer needs to buy only one product and does not need to match this product with other products. Moreover, the arrangement in which the adapter assembly and the charging cable assembly are both disposed in the housing component facilitates sorting and carrying. The charging cable body is retractable on the housing component. When the adapter is used, the consumer can stretch out and freely adjust the charging cable body according to the length actually required so that the application range of the use distance is expanded. After the adapter is used, the charging cable body is retractable into the housing component. The automatic retraction of the charging cable body relative to the auto-retractable cable box facilitates use and storage, simplifies the structure, avoids problems like a messy structure, a broken charging cable body, or a poor contact, and thus improves the user experience. Moreover, when the adapter is not used, the first connector and the charging cable body are both disposed in the accommodation space, reducing the size of the structure and enhancing portability.

What is claimed is:

1. An adapter, comprising:
 a housing component provided with an accommodation space;
 an adapter assembly disposed in the accommodation space;
 a first connector electrically connected to the adapter assembly and able to be accommodated in the accommodation space;
 a charging cable assembly comprising a charging cable body and an auto-retractable cable box disposed in the accommodation space, wherein a first end of the charging cable body is secured to the auto-retractable cable box, a second end of the charging cable body is able to be accommodated in the auto-retractable cable box or extend out of the auto-retractable cable box, and the auto-retractable cable box is electrically connected to the adapter assembly; and
 a second connector connected to the second end of the charging cable body;
 wherein the adapter assembly further comprises a mounting bracket secured in the accommodation space, the first connector is rotatably connected to the mounting bracket, the mounting bracket is provided with an accommodation recess, and the first connector is rotatable relative to the mounting bracket to be accommodated in the accommodation recess or extend out of the accommodation recess.

2. The adapter of claim 1, wherein the adapter assembly comprises a circuit board for dividing the accommodation space into:
 a first accommodation space, wherein the mounting bracket is disposed in the first accommodation space, and the first connector is extendable out of the first accommodation space; and
 a second accommodation space, wherein the charging cable assembly is disposed in the second accommodation space, and the charging cable body is extendable out of the second accommodation space.

3. The adapter of claim 1, wherein the auto-retractable cable box is provided with a magnet structure, and the second connector is able to be attracted by the magnet structure.

4. The adapter of claim 2, wherein the auto-retractable cable box is provided with a magnet structure, and the second connector is able to be attracted by the magnet structure.

5. The adapter of claim 3, wherein the auto-retractable cable box comprises:
 a conductive support comprising a fixed shaft, a coil spring, and a reel sleeved on the fixed shaft, wherein a first end of the coil spring is secured to the fixed shaft, a second end of the coil spring is connected to the reel, and the first end of the charging cable body is secured to the fixed shaft; and
 a conductive connection plate electrically connected to the conductive support and the adapter assembly separately, wherein the conductive support is securely connected to the conductive connection plate.

6. The adapter of claim 5, wherein the auto-retractable cable box further comprises a mounting casing securely connected to the adapter assembly, the mounting casing is provided with an accommodation cavity, the conductive support and the conductive connection plate are both disposed in the accommodation cavity, the mounting casing is provided with a cable outlet communicating with the accommodation cavity, and the charging cable body passes through the cable outlet and is connected to the second connector.

7. The adapter of claim 6, wherein each of the conductive support and the conductive connection plate is provided with a through hole, the mounting casing comprises an upper casing and a lower casing, the upper casing comprises a connection rod, the connection rod passes through a through hole of the conductive support, a through hole of the conductive connection plate, and the lower casing, the upper casing is supported on the lower casing, and the connection rod is detachably connected to the adapter assembly through a fastener.

8. The adapter of claim 6, wherein an inner mounting recess for mounting the magnet structure is disposed in an inner wall of the mounting casing, and an outer mounting recess for accommodating the second connector is disposed in an outer wall of the mounting casing, wherein the inner mounting recess is disposed opposite to the outer mounting recess.

9. The adapter of claim 8, wherein the housing component is cuboid, and the outer mounting recess is disposed at a corner of the housing component.

10. The adapter of claim 1, wherein the housing component comprising:
 a plastic cover; and
 a plastic casing provided with an opening, wherein the plastic cover closes the opening, the plastic cover and the plastic casing enclose the accommodation space, and the plastic casing is provided with a first aperture and a second aperture communicating with the accommodation space separately, wherein the first connector is extendable out of the first aperture, and the second connector is extendable out of the second aperture.

11. The adapter of claim 10, wherein the adapter assembly comprises a circuit board for dividing the accommodation space into:
 a first accommodation space, wherein the mounting bracket is disposed in the first accommodation space, and the first connector is extendable out of the first accommodation space; and
 a second accommodation space, wherein the charging cable assembly is disposed in the second accommodation space, and the charging cable body is extendable out of the second accommodation space.

* * * * *